United States Patent [19]
Furuhashi et al.

[11] Patent Number: 5,408,310
[45] Date of Patent: Apr. 18, 1995

[54] OPTICAL TIME DOMAIN REFLECTOMETER HAVING SHORTENED DEAD ZONE

[75] Inventors: Masaaki Furuhashi; Ryoji Handa, both of Tokyo, Japan

[73] Assignee: Ando Electric Co., Ltd., Tokyo, Japan

[21] Appl. No.: 174,050

[22] Filed: Dec. 28, 1993

[30] Foreign Application Priority Data

Dec. 29, 1992 [JP] Japan .................. 4-360244

[51] Int. Cl.⁶ ............................................ G01N 21/88
[52] U.S. Cl. ..................................................... 356/73.1
[58] Field of Search ........................................... 356/73.1

[56] References Cited

U.S. PATENT DOCUMENTS

| 4,914,394 | 4/1990 | Meyer | 324/534 |
| 5,008,545 | 4/1991 | Anderson et al. | 356/73.1 X |
| 5,062,704 | 11/1991 | Bateman | 356/73.1 |
| 5,148,230 | 9/1992 | Lane et al. | 356/73.1 |

FOREIGN PATENT DOCUMENTS

| 0297669 | 1/1989 | European Pat. Off. |
| 0453816 | 10/1991 | European Pat. Off. |

*Primary Examiner*—Vincent P. McGraw
*Attorney, Agent, or Firm*—Finnegan, Henderson, Farabow, Garrett & Dunner

[57] ABSTRACT

A driver circuit 2 generates a pulse current on the basis of an electrical pulse outputted from a timing generating portion 1. A light source 3 emits a light pulse according to the pulse current. The light pulse outputted from the light source 3 goes to a delay optical fiber 9 through an optical waveguide directional coupler 4, and then goes to a measuring optical fiber 10. A delay circuit 11 delays a digital operation of a digital operating portion 7, by a time required for said light pulse to go back and forth in the delay optical fiber 9.

2 Claims, 5 Drawing Sheets

OPTICAL TIME DOMAIN REFLECTOMETER HAVING SHORTENED DEAD ZONE

BACKGROUND OF THE INVENTION

1. Field of the Invention

The present invention relates to an optical time domain reflectometer which is used in an optical fiber network to inspect for damage of the optical fibers.

2. Prior Art

The optical time domain reflectometer (OTDR) is an apparatus which measures a damaged point, a transmission loss or a connecting loss of an optical fiber by outputting a light pulse from the OTDR to a measuring optical fiber through an optical waveguide directional coupler, and by detecting a returned light pulse from the measuring optical fiber.

FIG. 4 is a block diagram showing a conventional OTDR. In FIG. 4, a timing pulse generating portion 1 generates an electrical pulse. A driver circuit 2 generates a pulse current according to the electrical pulse, and outputs the pulse current to a light source 3. The light source 3 generates a light pulse (laser) according to the pulse current. The light pulse is inputted to a measuring optical fiber 10 through an optical waveguide directional coupler 4. As a result, light such as back scattering light and reflected light is returned from the optical fiber 10 to the optical waveguide directional coupler 4. The returned light is transmitted from the optical waveguide directional coupler 4 to a light receiver 5. The returned light is then transformed to an electrical signal in a light receiver 5, and the electrical signal is amplified in an amplifier 6. The electrical signal from the amplifier 6 is transformed into a digital signal, and an operation, such as an averaging operation, is applied to decrease a noise in the signal in the digital operating portion 7. Furthermore, the digital signal is transformed on the basis of a logarithm, and is then displayed in the display portion 8.

The back scattering light from the measuring optical fiber 10 is caused by a raleigh scattering light which accrues in the measuring optical fiber 10. The level of the back scattering light becomes approximately 50 dB lower value than the level of the inputted light pulse, in the case wherein the measuring optical fiber 10 is a single mode fiber, and the inputted light pulse has a width of $1 \times 10^{-6}$ second.

The velocity of the light pulse, when it is transmitted in the optical fiber, is the value which is used to divide an evacuated light velocity with a refractive index of a material of the optical fiber, and thereby the extent of the light purist in a length direction (along the long axis) of the optical fiber is obtained by producing the velocity and the pulse width of the light pulse. In this embodiment, the extent of the light pulse becomes approximately one hundred meters in the case of the single mode fiber.

In the OTDR, the extent of the light pulse in the length direction (along the long axis) must be a small value in order to improve the resolving power for measurement of the distance to a damaged point. For example, if the inputted light pulse has a width of $1 \times 10^{-8}$ second, the extent thereof will be approximately one meter. However, the level of the back scattering light becomes a low value in proportion to the pulse width, that is, the level of the back scattering light becomes approximately 70 dB lower in value than that of the inputted light pulse.

Furthermore, a cross talk light (L1), which occurs in the optical waveguide directional coupler 4, is directly transmitted to the light receiver 5. A reflected light (L2), which occurs at an input connector of the measuring optical fiber 10 via an outputted light from the optical waveguide directional coupler 4 is refracted, and is transmitted to the light receiver. This cross talk light (L1) and reflected light (L2) are supplied to the light receiver 6 with the back scattering light.

The level of the cross talk light (L1) is determined by the efficiency of the optical waveguide directional coupler 4, and, in this case, is approximately 40 dB lower value than that of the inputted light pulse. The level of the reflected light (L2) is determined by the efficiency of the connector, and becomes approximately 40 dB lower in value than that of the inputted light pulse.

The cross talk light (L1) and the reflected light (L2) are supplied to the light receiver 5 at approximately the same time, so that both are added, and thus the level of light inputted to the light receiver 5 is two times the value thereof.

However, in the conventional OTDR, the light receiver 5 must receive only the back scattering light which is approximately 70 dB lower than the inputted light pulse. However, the light receiver 5 receives the sum of the cross talk light (L1) and the reflected light (L2), which is approximately 40 dB lower than the inputted light pulse (i.e. one thousand times the intensity of the back scattering light), with the back scattering light. As a result, the light receiver 5 and the amplifier 6 are saturated. An interval whereat the light receiver 5 can normally receive the back scattering light after the above mentioned effect decreases, is called a dead zone.

The level of the back scattering light, the level of the cross talk light(L1), the level of the reflected light (L2) and the level of the sum of the cross talk light (L1) and the reflected light (L2), in the case wherein the width of the light, pulse is $1 \times 10^{-8}$ second, and the dead zone NT are shown as a display example of the display of the OTDR in FIG. 5. As shown in FIG. 5, the conventional OTDR has a relatively long dead zone NT, add as a result, it is not possible to detect damages to the optical fiber quickly.

SUMMARY OF THE INVENTION

Accordingly, it is an object of the present invention to provide an OTDR which is used in an optical fiber network to check for damage of the optical fibers, having, in particular, a short dead zone.

In an aspect of the present invention, there is provided an optical time domain reflectometer for detecting the damaged point of an optical fiber (10), wherein the optical time domain reflectometer supplies a light pulse which is outputted from a light source (3) to the optical fiber (10) through an optical waveguide directional coupler (4), and transmits reflected light outputted from the optical fiber (10) to a light receiver (5) through the optical waveguide direction coupler (4), then manipulates a signal outputted from the light receiver (5) in a digital operating portion (7), and displays a result of the manipulation by the digital operating portion (7), wherein the optical time domain reflectometer comprises a delay optical fiber (9) for delaying said light pulse, the delay optical fiber being inserted between the optical waveguide directional coupler (4) and the optical fiber (10), the delay optical fiber (9) and the optical waveguide directional coupler (4) being connected by a melting connecting method so that no reflection occurs at the connection position; and a delay means (11) for delaying an operating timing of the digital operating portion (7) by a time required for the light pulse to go and return in the delay optical fiber (9).

In accordance with this invention, it is possible to restrict the saturation phenomenon in the light receiver, because the cross talk light and the reflected light are not supplied to the light receiver at the same time. Therefore, it is possible to shorten and dead zone in which there is an interval wherein damage to the optical fiber cannot be measured. As a result, it is possible to receive the back scattering light quickly. Furthermore, it is possible to compensate an origin for measuring a distance to the damaged point of the optical fiber.

BRIEF DESCRIPTION OF THE DRAWINGS

Further objects and advantages of the present invention will be apparent from the following description, with reference being made to the accompanying drawings wherein the preferred embodiments of the present invention are clearly shown.

DESCRIPTION OF A PREFERRED EMBODIMENT

Figure 1:
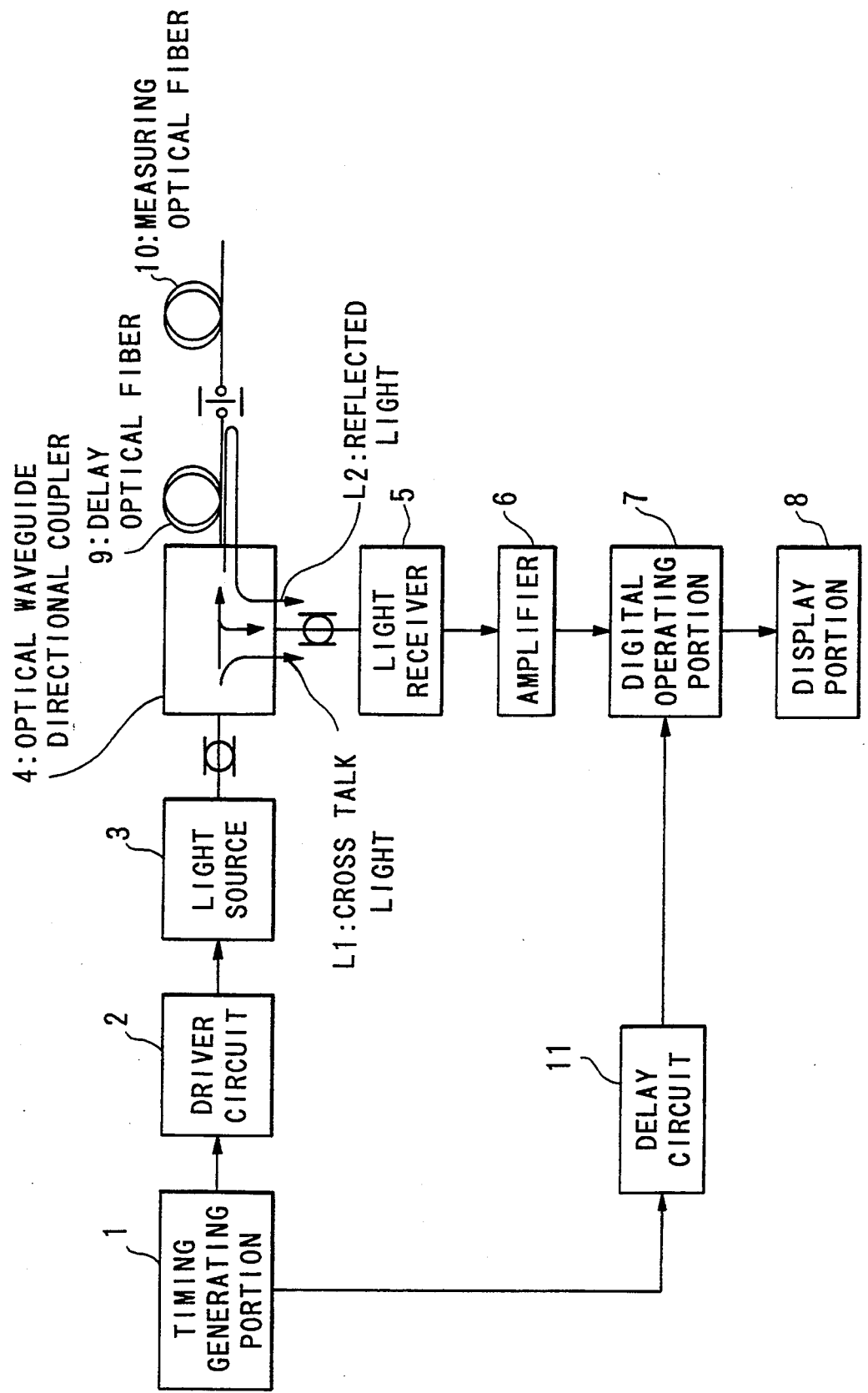
FIG. 1 is a block diagram showing the OTDR according to an embodiment of the present invention.

FIG. 1 is a block diagram showing the OTDR according to an embodiment of the present invention. In FIG. 1, a delay optical fiber 9 is inserted between the optical waveguide directional coupler 4 and the measuring optical fiber 10. The OTDR includes of a delay circuit 11 to delay a timing signal, which is transmitted from the timing generated portion 1 to the digital operating portion 7, by a predetermined time. Accordingly, the digital operating portion 7 is driven by the delayed timing signal.

The optical waveguide directional coupler 4 and the delay optical fiber 9 are connected by using a melting connecting method, such that no refraction occurs at the connected portion. The length of the delay optical fiber 9 is the same as, or longer than, the extent of the light pulse, which is outputted to the measuring optical fiber 10, in the direction of the long axis. On the other hand, the distance between the light source 3 and the optical waveguide directional coupler 4, and the distance between the optical waveguide directional coupler 4 and the light receiver 5 is shorter than the above extent.

For example, when the light pulse has a width of $1 \times 10^{-6}$ seconds, the length of the delay optical fiber 9 is approximately one hundred meters longer than the distance between the light source 3 and the optical waveguide directional coupler 4. The delay time of the delay circuit 11 is the same as the required time for the light pulse to go back and forth in the delay optical fiber 9. That is, the delay time of the delay circuit is $2 \times 10^{-6}$ seconds in this embodiment.

The driver circuit 2 generates a pulse current according to the electrical pulse supplied from the timing generating portion 1, and thus, the light source 3 emits a light pulse. The light pulse outputted from the light source 3 goes to the delay optical fiber 9 through the optical waveguide directional coupler 4, and then goes to the measuring optical fiber 10. In the optical waveguide directional coupler 4, when the light pulse passes this coupler, the cross talk light (L1) occurs and is directly transmitted to the light receiver 5. However, via the effect of the delay optical fiber 9, the cross talk light (L1) Is not transmitted with the reflected light (L2) which occurs at the same time, at the connector of the measuring optical fiber 10.

Figure 2:
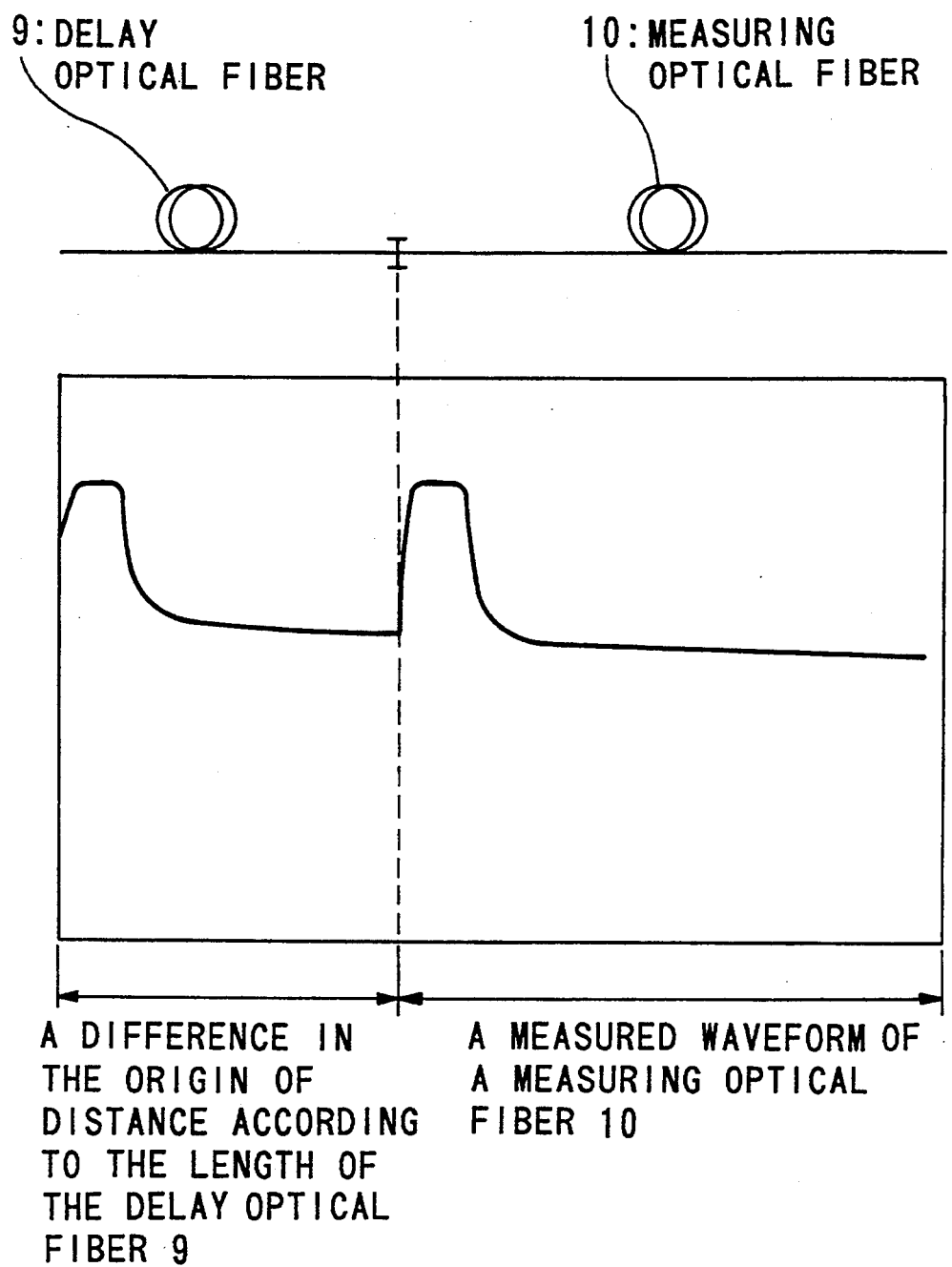
FIG. 2 is a pictorial view showing a display example of the OTDR when a delay optical fiber is inserted therein, in this embodiment.

FIG. 2 shows a display example of the OTDR in this embodiment. As shown in FIG. 2, in this embodiment, the saturation phenomenon of the light receiver 5 and the amplifier 6, by the reflected light (L2), is restricted, so that the release time is shortened. As a result, the light receiver 5 can receive the back scattering light quickly. That is, it is possible to decrease the dead zone NT.

Figure 3:
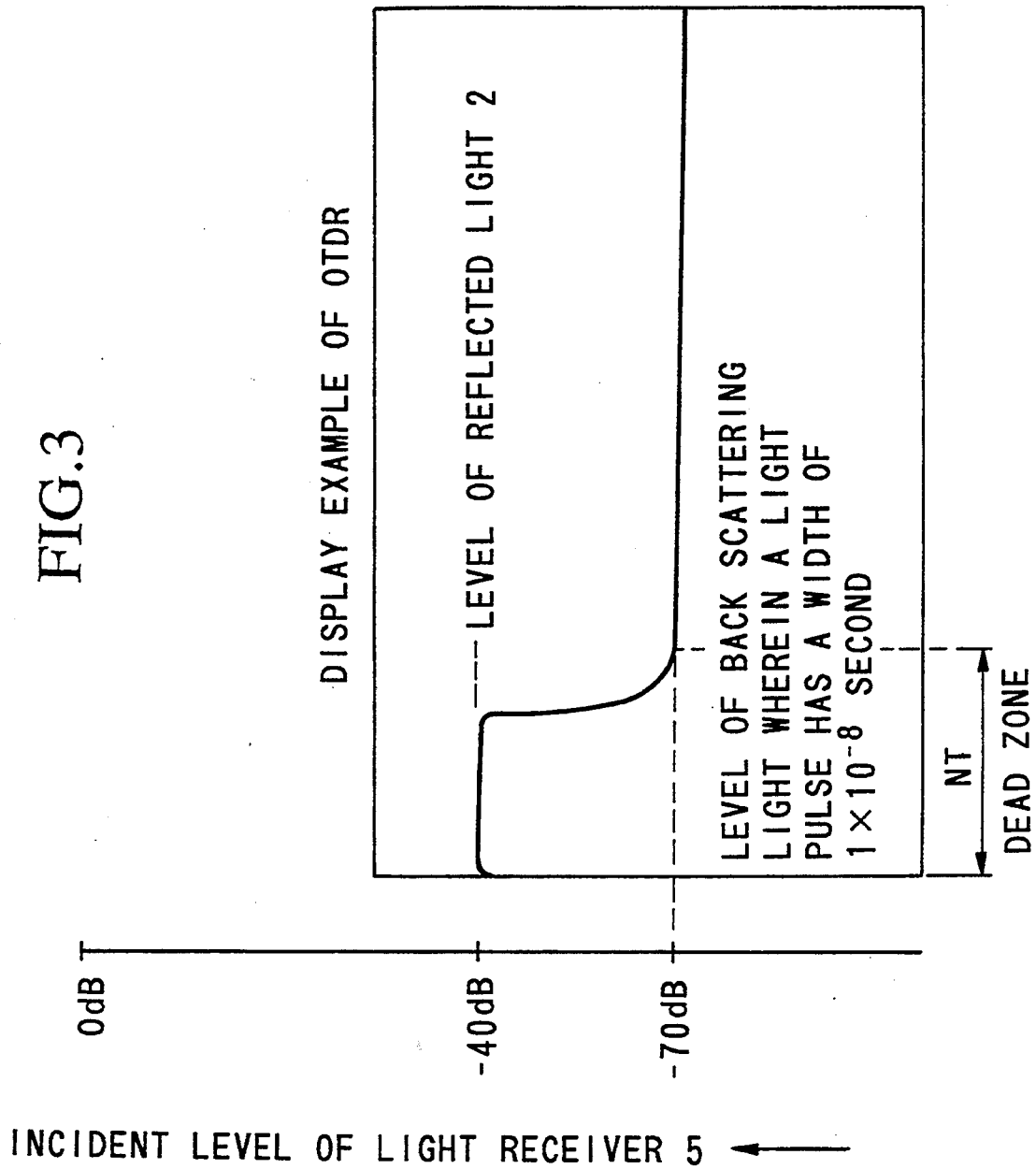
FIG. 3 is a pictorial view showing a display example of the OTDR, wherein the OTDR compensates the origin of the distance via the delay circuit 1.
Figure 4:
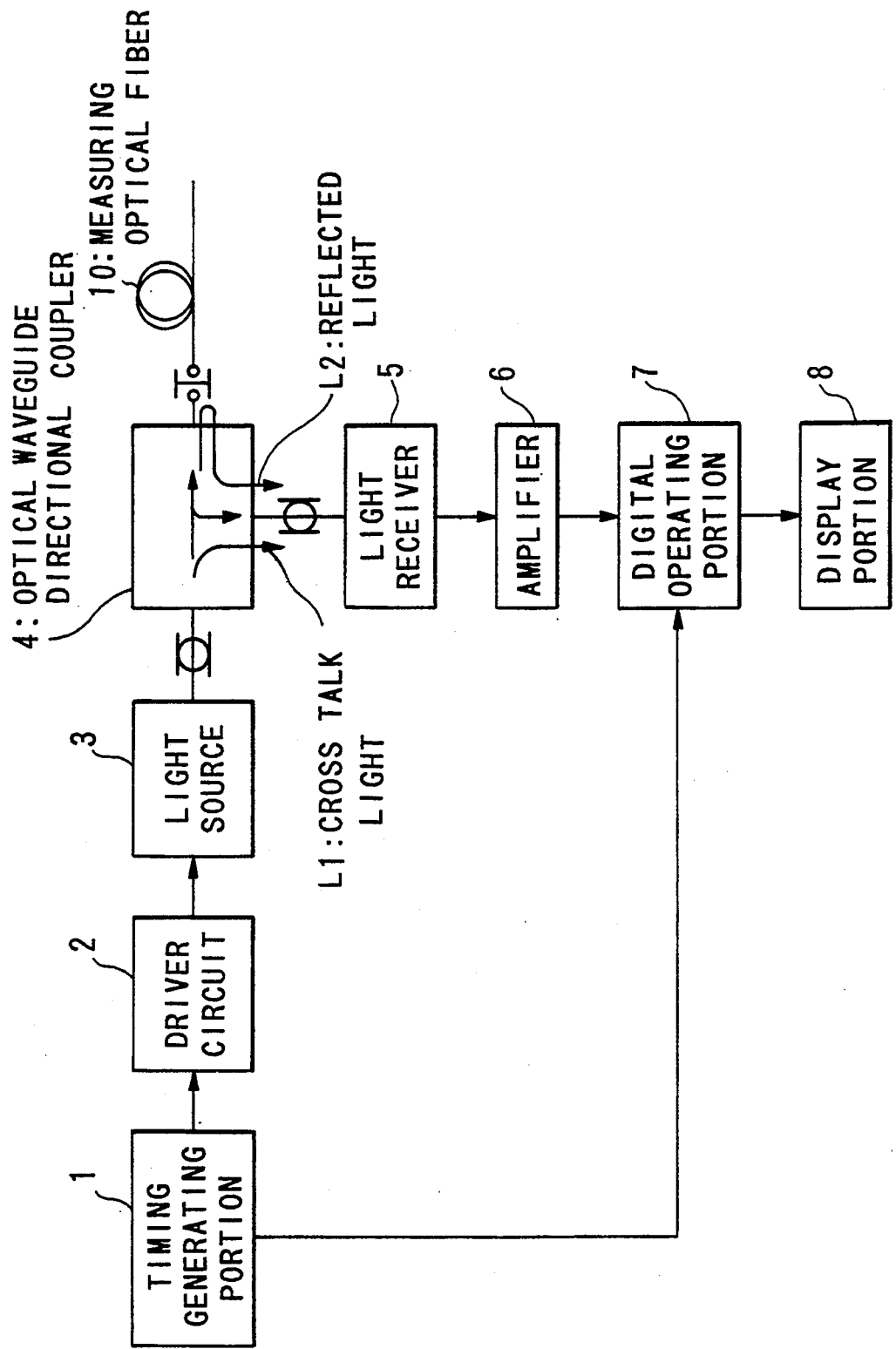
FIG. 4 is a block diagram showing a conventional OTDR.
Figure 5:
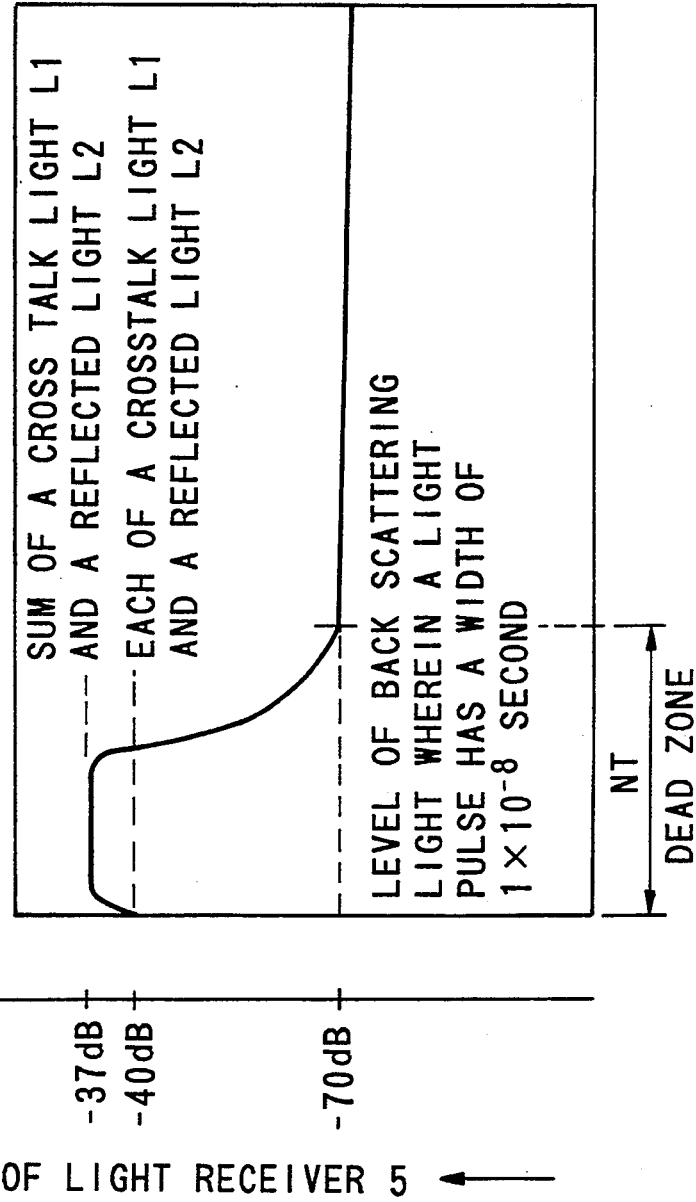
FIG. 5 is a pictorial view showing a display example of the conventional OTDR.

Furthermore, the delay circuit 11 delays an operating timing of the digital operating portion 7 by the time required for the light to go back and forth In the delay optical fiber 9. Thus, when the result is displayed on the display portion 8 after the digital transformation of the averaging treatment and the logarithm transformation of the digital operating portion 7, the origin of the distance accords with a place on the connector between the delay optical fiber 9 and the measuring optical fiber 10. As a result, a difference in the origin, according to the length of the delay optical fiber 9, is compensated. FIG. 3 shows a display example of the OTDR in FIG. 2, in the same scale as that used in FIG. 5, in the case wherein the origin of the distance is compensated by the delay circuit 11.

What is claimed is:

1. An optical time domain reflectometer for detecting the damaged point of an optical fiber (10), wherein said optical time domain reflectometer supplies a light pulse which is outputted from a light source (3) to said optical fiber (10) through an optical waveguide directional coupler (4), and transmits reflected light outputted from said optical fiber (10) to a light receiver (5) through said optical waveguide direction coupler (4), then manipulates a signal outputted from said light receiver (5) in a digital operating portion (7), and displays a result of said manipulation by said digital operating portion (7), wherein said optical time domain reflectometer comprises:

a delay optical fiber (9) for delaying said light pulse, said delay optical fiber being inserted between said optical waveguide directional coupler (4) and said optical fiber (10), the delay optical fiber (9) and said optical waveguide directional coupler (4) being connected by a melting connecting method so that no reflection occurs at the connection position; and a delay means (11) for delaying an operating timing of said digital operating portion (7) by a time required for said light pulse to go and return in the delay optical fiber (9).

2. An optical time domain reflectometer according to claim 1, wherein a length of said delay optical fiber is equal or more than the extent of said light pulse in the length direction of the long axis of an optical fiber; and a distance between said light source and said optical waveguide directional coupler, and a distance between said optical waveguide directional coupler and said light receiver are shorter than said extent of said light pulse in the direction of the long axis of an optical fiber.

* * * * *